(12) United States Patent
Gupta et al.

(10) Patent No.: US 11,054,807 B2
(45) Date of Patent: Jul. 6, 2021

(54) SYSTEMS AND METHODS FOR HYBRID AUTOMATA MINING FROM INPUT-OUTPUT TRACES OF CYBER-PHYSICAL SYSTEMS

(71) Applicants: Sandeep K. S. Gupta, Tempe, AZ (US); Ayan Banerjee, Tempe, AZ (US); Imane Lamrani, Tempe, AZ (US)

(72) Inventors: Sandeep K. S. Gupta, Tempe, AZ (US); Ayan Banerjee, Tempe, AZ (US); Imane Lamrani, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 16/413,018

(22) Filed: May 15, 2019

(65) Prior Publication Data

US 2019/0354087 A1    Nov. 21, 2019

Related U.S. Application Data

(60) Provisional application No. 62/671,976, filed on May 15, 2018.

(51) Int. Cl.
| | | |
|---|---|---|
| *G05B 19/4155* | (2006.01) | |
| *G06F 17/12* | (2006.01) | |
| *G06F 7/552* | (2006.01) | |
| *G06N 5/04* | (2006.01) | |

(52) U.S. Cl.
CPC ......... *G05B 19/4155* (2013.01); *G06F 7/552* (2013.01); *G06F 17/12* (2013.01); *G06N 5/04* (2013.01); *G05B 2219/35261* (2013.01); *G05B 2219/37496* (2013.01)

(58) Field of Classification Search
CPC combination set(s) only.
See application file for complete search history.

(56) References Cited

U.S. PATENT DOCUMENTS

| | | | |
|---|---|---|---|
| 9,424,084 B2 | 8/2016 | Gupta et al. | |
| 9,619,213 B2 | 4/2017 | Gupta et al. | |
| 9,626,521 B2 | 4/2017 | Gupta et al. | |
| 9,642,543 B2 | 5/2017 | Banerjee et al. | |
| 9,706,963 B2 | 7/2017 | Gupta et al. | |
| 9,778,628 B2 * | 10/2017 | Leonardi | G05B 23/0267 |
| 10,074,028 B2 | 9/2018 | Gupta et al. | |
| 10,342,447 B2 | 7/2019 | Banerjee et al. | |
| 10,409,706 B2 * | 9/2019 | Fainekos | G06F 11/3676 |

(Continued)

FOREIGN PATENT DOCUMENTS

| | | |
|---|---|---|
| WO | 2014018555 A1 | 1/2014 |
| WO | 2015095530 A1 | 6/2015 |

OTHER PUBLICATIONS

Medhat et al., "A Framework for Mining Hybrid Automata from Input/Output Traces" Pub. 2015.*

(Continued)

*Primary Examiner* — Vincent H Tran
(74) *Attorney, Agent, or Firm* — Polsinelli PC

(57) ABSTRACT

Systems and methods for mining hybrid automata from input-output traces of cyber-physical systems are disclosed herein.

19 Claims, 10 Drawing Sheets
(7 of 10 Drawing Sheet(s) Filed in Color)

(56) References Cited

U.S. PATENT DOCUMENTS

| | | | |
|---|---|---|---|
| 10,575,788 | B2 | 3/2020 | Gupta et al. |
| 10,613,875 | B1* | 4/2020 | Lysaght ............... G05B 19/045 |
| 2007/0271204 | A1* | 11/2007 | Jiang ...................... G05B 17/02 706/6 |
| 2010/0094611 | A1* | 4/2010 | Sankaranarayanan ...................... G01R 31/318357 703/22 |
| 2013/0317377 | A1 | 11/2013 | Gupta et al. |
| 2014/0278333 | A1 | 9/2014 | Gupta et al. |
| 2015/0261898 | A1 | 9/2015 | Gupta et al. |
| 2015/0277410 | A1 | 10/2015 | Gupta et al. |
| 2016/0313779 | A1 | 10/2016 | Gupta et al. |
| 2018/0189678 | A1 | 7/2018 | Gupta et al. |
| 2018/0300487 | A1 | 10/2018 | Gupta et al. |
| 2018/0301061 | A1 | 10/2018 | Paudyal et al. |
| 2019/0179988 | A1* | 6/2019 | Malik ..................... G06F 17/13 |
| 2019/0188587 | A1 | 6/2019 | Gupta et al. |
| 2019/0212803 | A1 | 7/2019 | Gupta et al. |
| 2020/0108203 | A1 | 4/2020 | Lamnrani et al. |

OTHER PUBLICATIONS

U.S. Appl. No. 16/775,984, filed Jan. 29, 2020, Banerjee et al.

Alur, et al. "Hybrid automata: An algorithmic approach to the specification and verification of hybrid systems." Hybrid systems. Springer, Berlin, Heidelberg, 1993. 209-229.

Andersen, Kim E., and Malene Hjbjerre. "A Bayesian approach to Bergmans minimal model." Insulin 50.100 (2002):200.

Balakrishnan, et al. "Inference methods for autonomous stochas-tic linear hybrid systems." International Workshop on Hybrid Systems: Computation and Control, 2004.

Blackmore, et al. "Model learning for switching linear systems with autonomous mode transitions." Proceedings of the IEEE Conference on Decision and Control (CDC). 2007.

Buzhinsky, et al. "Modification of the method of generation of control finite-state machines with continuous actions based on training examples." Journal of Computer and Systems Sciences International (2015).

Clarke, et al. "Closed-loop artificial pancreas using subcutaneous glucose sensing and insulin delivery and a model predictive control algorithm: the Virginia experience." (2009): 1031-1038.

Das, et al. "Model Guided Deep Learning Approach Towards Prediction of Physical System Behavior." Machine Learning and Applications (ICMLA), 16th IEEE International Conference 2017.

Frehse, et al., SpaceEx State Space Explorer, http://spaceex.imag.fr/.

Hinshaw, et al. "Diurnal pattern of insulin action in type 1 diabetes implications for a closed-loop system." Diabetes 62.7 (2013).

Katsios, et al., "Individual genomes and personalized medicine: life diversity and complexity." Personalized Medicine 7, No. 4 (2010): 347-350.

Lara, et al., "On the hyperboxhy-perplane intersection problem." INFOCOMP (2009).

Lyde, et al., "Extracting hybrid automata from control code." NASA Formal Methods Symposium, 2013.

Man, et al. "The UVA/PADOVA type 1 diabetes simulator: new features." Journal of diabetes science and technology 2014.

Medhat, et al. "A framework for mining hybrid automata from input/output traces." Proceedings of the 12th International Conference on Embedded Software. IEEE Press, 2015.

Milanese, et al., "Estimation theory and uncertainty intervals evaluation in presence of unknown but bounded errors: Linear families of models and estimators." IEEE Transactions on automatic control 27, No. 2 (1982): 408-414.

Minopoli, et al., "Non-convex invariants and urgency conditions on linear hybrid automata." International Conference on Formal Modeling and Analysis of Timed Systems 2014.

Minopoli, et al., "SL2SX translator: From simulink to spaceex models." 19th International Conference on Hybrid Systems: Computation and Control. ACM, 2016.

Nabar, et al. "GeM-REM: Generative model-driven resource efficient ECG monitoring in body sensor networks." Body Sensor Networks (BSN), 2011 International Conference on. IEEE, 2011.

Summerville, et al., "Charda: Causal hybrid automata recovery via dynamic analysis." (2017).

* cited by examiner

SYSTEMS AND METHODS FOR HYBRID AUTOMATA MINING FROM INPUT-OUTPUT TRACES OF CYBER-PHYSICAL SYSTEMS

CROSS REFERENCE TO RELATED APPLICATIONS

This is a U.S. non-provisional patent application that claims benefit to U.S. provisional patent application Ser. No. 62/671,976 filed on May 15, 2018, which is incorporated by reference in its entirety.

GOVERNMENT SUPPORT

This invention was made with government support under grant number 1116385 awarded by the National Science Foundation. The government has certain rights in the invention.

FIELD

The present disclosure generally relates to cyber-physical systems, and in particular, to systems and methods for hybrid automata mining from input-output traces of cyber physical systems.

BACKGROUND

Cyber-physical system (CPS) design and implementation has seen a new revolution of personalization. In the medical domain, one of the primary results of the human genome project is personalized medicine, where diagnosis and treatment for an individual depends on the person's unique clinical, genetic, genomic, and environmental information. Some devices have been designed based on data collected from a pool of individuals in real world scenarios. However, such excursions can lead to sub-optimal control decision results. The implication being any medical CPS used by an individual should be configured considering the unique parameters of the physical system (or, the individual). Given such trends towards personalization and customization, CPS verification techniques should also be equipped with capabilities to configure themselves to consider unique parameters of the physical system.

One of the versatile tools used for CPS verification is the hybrid dynamical system, which models both continuous-time and discrete-time behavior to accurately describe how analog physical processes and digital computational processes interact. A hybrid automaton may be described as a finite-state machine wherein continuous-time variables are modeled and analyzed using ordinary differential equations.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures do not limit the scope of the claims.

DETAILED DESCRIPTION

A computer-implemented system to automatically extract hybrid automata from input-output traces collected from the run-time behavior of a cyber-physical system (CPS), hereafter referred to as "the disclosed method", "the computer-implemented system" or "the present system" is disclosed. Input-output traces are collected from the operation of the CPS. Collected input-output traces may be divided into two sets: traces that are used to infer the hybrid automata and traces which are employed to verify the accuracy of the inferred hybrid automata.

Figures 1A, 1B:
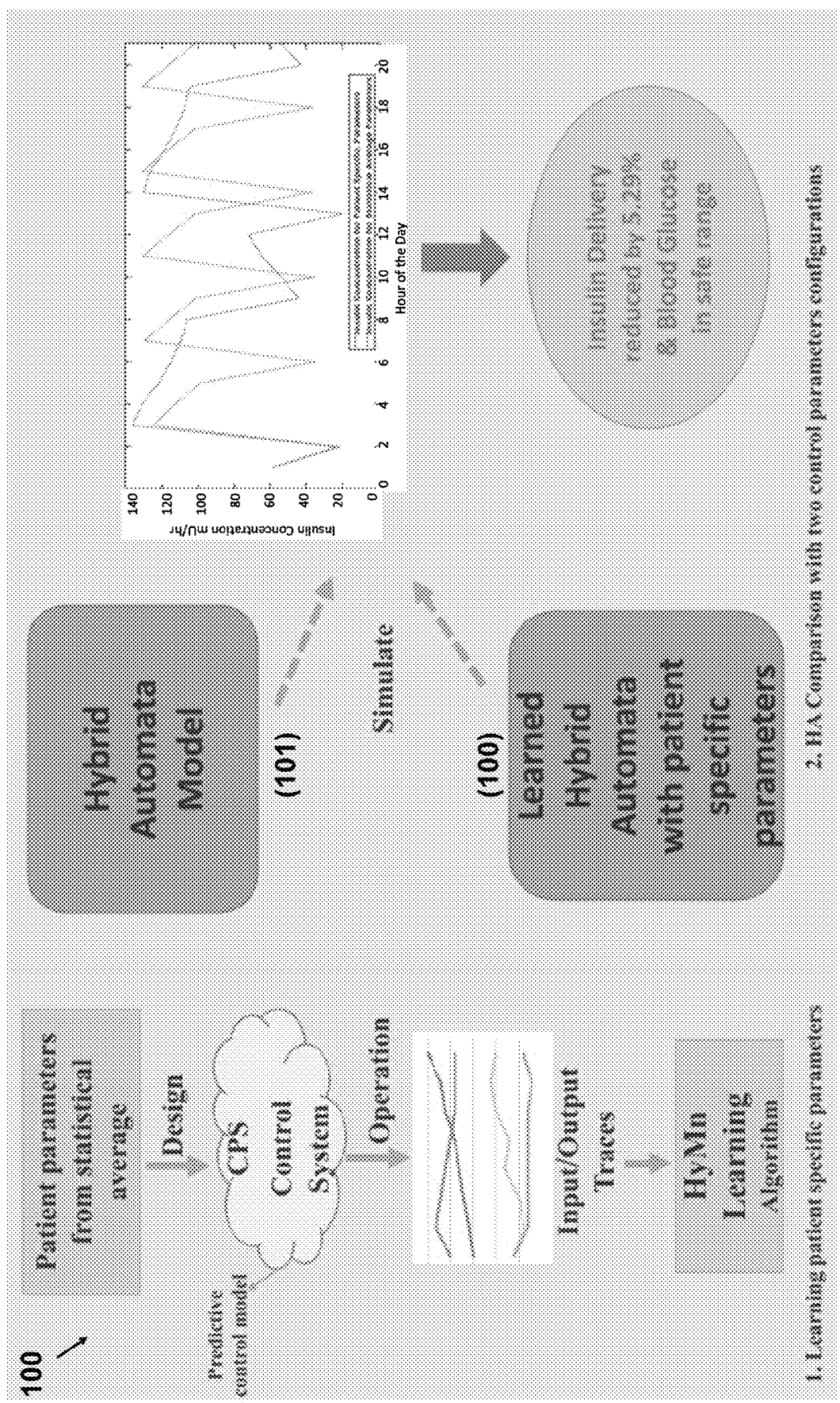
FIG. 1A is a simplified block diagram showing the overall scheme of the present computer-implemented system to infer a hybrid automata system.
FIG. 1B is a graphical representation showing a comparison between the control decision of the present computer-implemented system utilizing patient specific parameters and the control decision of a system utilizing average statistical estimates.

In some embodiments, the disclosed method takes a set of controller inputs (also described as a set of observed continuous states) $\vec{x}$ is and a set of controller outputs $\vec{o}$ as input and extracts a hybrid system of the form of the tuple {W, E, Inv, flow}. These inputs and outputs may be segmented into potential "controller mode changes". The segments may further be clustered into equivalence classes, wherein each equivalence class defines a discrete mode. In addition, flow equations and guard conditions may be derived. The controller modes may then be re-classified using distinctions from the flow equations and guard conditions. In this manner the disclosed process defines a specialized hybrid automaton to control the behavior of a CPS. A computer-implemented CPS system ("CPS control system"), designated 100, which utilizes patient specific parameters, is shown in FIG. 1A, and by contrast, FIG. 1B shows a comparison between the control decision of the control system utilizing patient specific parameters and the control decision of the system utilizing average statistical estimates.

System Model

Figure 2:
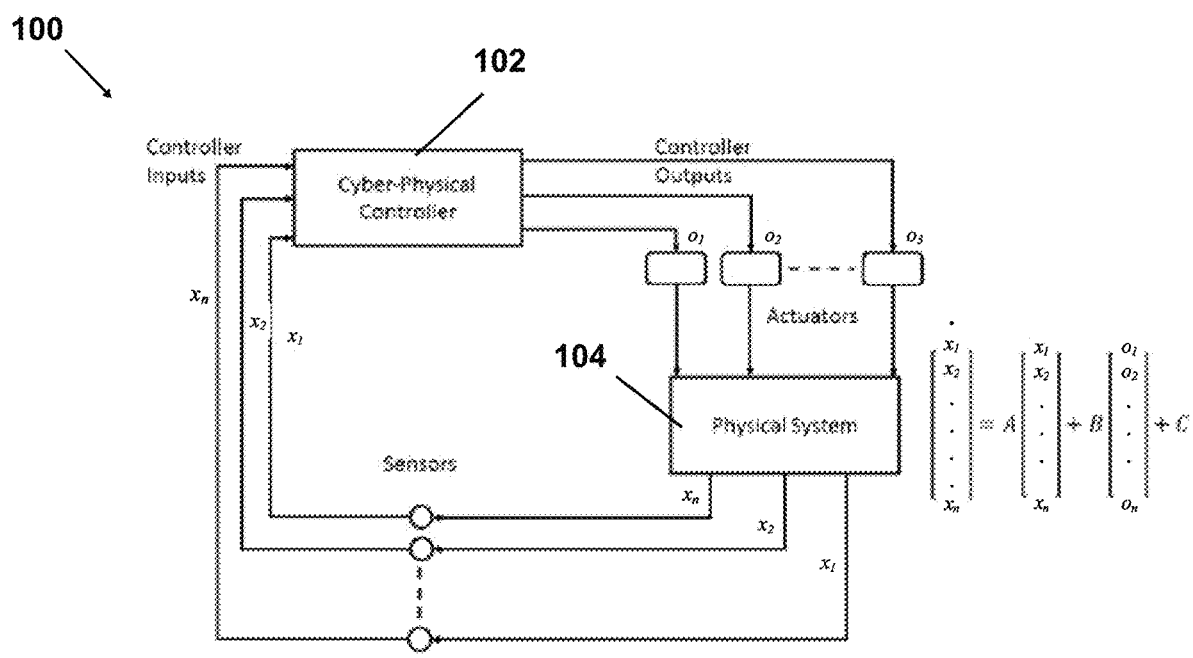
FIG. 2 is a simplified block diagram showing a cyber-physical control system.

Referring to FIG. 2, a CPS control system 100, may generally comprise a cyber-physical controller ("controller") 102 that interacts with a physical system 104 (e.g., an analog system, or any system with physical components that may be operated and/or actuated using the controller 102)

using a set of sensors and actuators. The physical system 104 can be expressed using a set of n continuous variables $\{x_1, x_2, \ldots, x_n\}$. The continuous variables are governed by some differential equations which are also modulated by p controller outputs $\{o_1, o_2, \ldots, o_p\}$. For a linear system, the continuous variables are governed by a set of linear differential equations as shown in FIG. 2. The continuous variables are provided as inputs to the controller 102, which the controller 102 uses to decide on the next set of outputs for operating the physical system 104. The continuous variables, or inputs to the controller that are observed using sensors as well as the controller outputs, form the input-output traces that are taken as input by the present system 100 to extract the linear automaton.

Linear Hybrid System

A linear hybrid automaton system is a formal model of a closed-loop control system. A controller (e.g., controller 102) measures values of the continuous variables representing a physical system 104 using a sensor and decides to switch modes if a certain condition is satisfied. This decision is transmitted to an actuator associated with the physical system 104 that performs the desired change. A linear hybrid automaton (HA) system is defined as a tuple of the following components:

$M = \{m_o \ldots m_q\}$ is a set of discrete states or control modes, wherein $m_o$ is the initial mode.

X is the continuous state space in which the continuous variables representing the physical system or the controller inputs $\vec{x} = \{x_1, x_2, \ldots, x_n\}$ take their values. Hence, $X \subset R^n$, where R is the set of real numbers.

A finite set of Control Switches in M*M, where $(m_i, m_j)$, defines the control switch from source mode $m_i$ to target mode $m_j$.

A Flow function assigns to each control mode $m \in M$ a set of linear differential algebraic equations that relates the continuous state space variables $\vec{x}$ to its derivatives and the controller outputs. For every discrete mode m, the equation takes the following form:

$$\frac{d\vec{x}}{dt} = A_m \vec{x} + B_m \vec{o} + C_m,$$

where $A_m$ is an n×n matrix, $B_m$ is an n×p matrix, and $C_m$ is an n×1 column vector.

A Guard condition is a function that maps every control switch to a guard condition. A mode switch takes place when the corresponding guard condition is satisfied.

A Reset function maps every control switch to a reset condition. In this paper, $\dot{x}$ and $$\frac{dx}{dt}$$

both mean "differential or x with respect to time t".

CPS Hybrid System: the Artificial Pancreas

Figure 3:
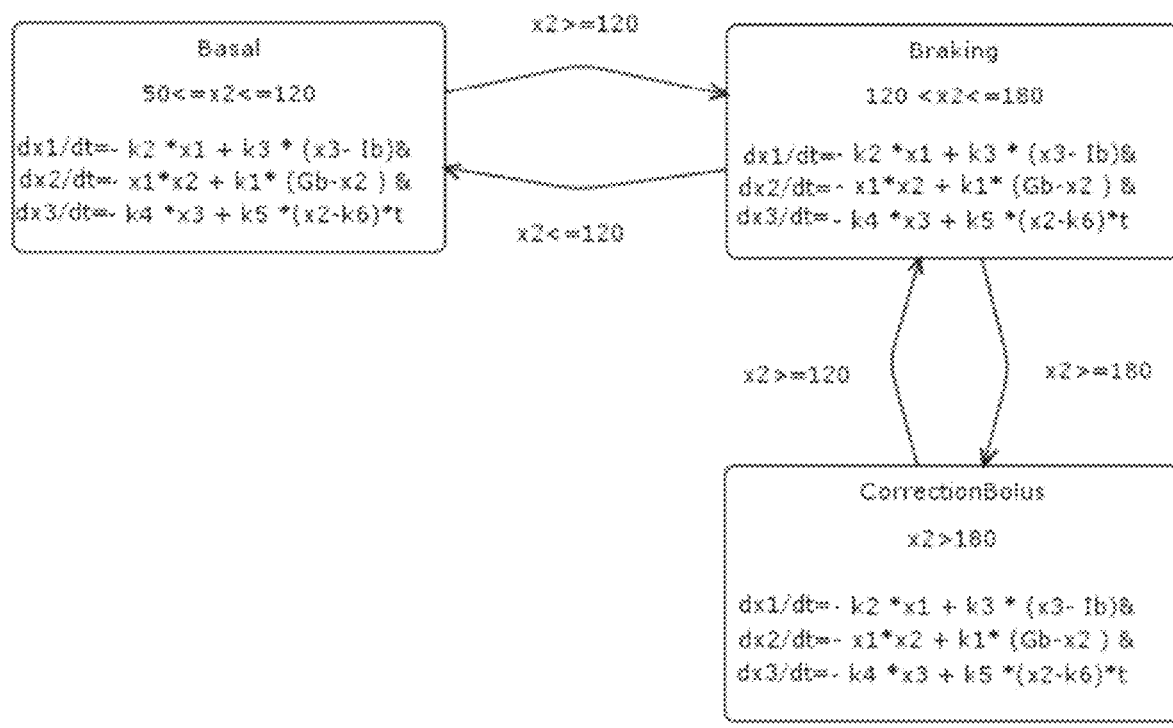
FIG. 3 is a simplified block diagram showing the hybrid system model of an artificial pancreas.

The Artificial Pancreas (herein referred to as "AP") control system is used for automated control of blood glucose level for Type 1 diabetic patients. The controller receives a glucose-meter value and outputs the correct amount of insulin infusion rate $I_t$ for the infusion pump. The aim is to maintain the prescribed level of blood glucose and avoid occurrence of hypoglycemic or hyperglycemic events. These dangerous events happen as a result of an inaccurate infusion of insulin, e.g. if the glucose concentration $B_g$ goes above 180 mg/dl, it can lead to hyperglycemia, while low glucose level (below 60 mg/dl) can cause hypoglycemia. The dynamics of the AP are represented by nonlinear equations 1, 2 and 3, where $\dot{X}$ represents the rate of the variation in the interstitial insulin concentration, $\dot{G}$ is the rate of change of blood glucose concentration $(B_g)$ for the infused insulin concentration X and $\dot{I}$ is the variation in plasma insulin concentration $(B_i)$. The AP device has three control modes:

1—basal, where $I_t=5$
2—braking, where $I_t=0.5B_g+44.75$
3—correction bolus, where $I_t=50$ FIG. 3 shows the hybrid system model of the AP. The differential equations expressing the blood glucose and insulin interaction are non-linear.

$$\dot{X} = -k_2 X(t) + k_3 (I(t) - I_b)$$

$$\dot{G} = -X(t)G(t) + k_1(G_b - G(t))$$

$$\dot{I} = -k_4 I(t) + k_5 (G(t) - k_6)^+ t$$

Note that only the blood glucose and insulin levels are the observed parameters. The parameter X is not observed but plays a significant role in relating blood glucose and insulin. This model of the physical system is assumed to be already available; the patient specific parameters must be derived by the model. An approximate linear system that matches closely with the real AP system is first derived.

Linearization of AP model: The AP system is nonlinear in nature; hence it is necessary to linearize the system. To linearize the AP model the difference in blood glucose, insulin concentration, and the interstitial insulin concentration are considered. A small time interval h is considered, re-writing:

$$G(h) = G(0) + \Delta G$$

$$X(h) = X(0) + \Delta X$$

$$I(h) = I(0) + \Delta I$$

The non-linear terms involving multiplication of $\Delta X$ and $\Delta G$ may be ignored. This results in the following linearized equations:

$$\Delta \dot{X} = -k_2(X(0) + \Delta X) + k_3(I(0) + \Delta I - I_b))$$

$$\Delta \dot{G} = -X(0) \cdot G(0) - \Delta X G(0) - \Delta G X(0) + k_1(G_b - G(0) - \Delta G)$$

$$\Delta \dot{I} = -k_4 I(0) + k_4 \Delta I + k_5 h G(0) - k_5 k_6 h$$

The problem of deriving an unbiased estimator of a continuous variable v from a series of observations is also considered. The estimator has design parameters expressed as a vector $\vec{\theta} = \{\theta_1, \theta_2, \ldots, \theta_k\}$. The term "unbiased" indicates that the expected value of the output of the estimator is the true value of v. Fisher information provides a measure of the information carried by v about an unknown design parameter $\theta_i$. Given a series of observations of the variable v and executions of the estimator, the Fisher information is given by $$\frac{\delta \ln P(v | \theta_i)}{\delta \theta_i}$$

where $P(v|\theta_i)$ is the conditional probability of the observation v given the value of the design parameter $\theta_i$. The larger the value of the Fisher information, the larger the contribution of $\theta_i$ in determining the value of v. Hence, an effective method to reduce the number of design parameters that make significant contribution in the estimator for v is to order them in decreasing order of Fisher information and only consider those design parameters that have significantly higher Fisher information. Once the most significant design parameters are identified, the next logical step is to derive the Minimum Variance Unbiased Estimator (MVUE) such that the mean value of the estimator output is the true value of v and the variance of the output of the estimator is minimized. In general, deriving the MVUE of a system from a set of observations is an extremely difficult proposition. However, if the underlying design model is linear, then the Cramer Rao Lower Bound (CRLB) theorem can be used to derive the MVUE. The CRLB considers a linear estimator for v such that: $\vec{v_o}$ =HD+w, where $\vec{v_o}$, is a set of observations for the variable v, H is a set of observations for the design parameters $\vec{\theta}$, D is the matrix of coefficients for the linear estimator, and w is the observation noise. The CRLB states that the Fisher information matrix is given by:

$$I + \frac{H^T H}{\delta^2}$$

where δ is the variance in the observation noise, while the MVUE is given by:

$$D=(H^T H)^{-1} H^T v$$

This result is used in the present computer-implemented system for two purposes:

a) to derive flow equations in modes of hybrid system using input output observations;

b) to derive non-rectangular guards which are expressed as linear combinations of continuous state variables of the hybrid system.

System Mining Methodology

Figure 4:
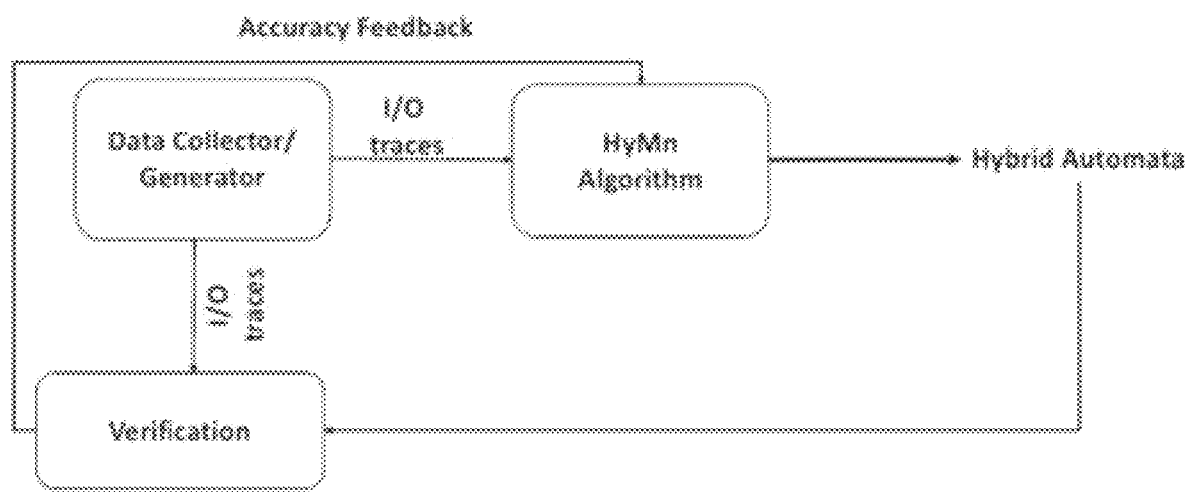
FIG. 4 is a simplified block diagram showing the interface technique utilized by the present computer-implemented system.

The present system is a methodology to automatically extract hybrid automata (hereafter referred to as "HA") from input-output traces collected from the run-time behavior of a CPS. FIG. 4 shows the main steps of the proposed technique.

Data Collector/Generator: Input-output traces are collected from the operation of a CPS. In this work, it is assumed that the traces are noiseless. Collected input-output traces are divided into two sets: traces that are used to infer the HA and traces that are employed to verify the accuracy of the inferred HA.

The present system takes the observed continuous states, or controller inputs $\vec{x}$ and the controller outputs $\vec{o}$, as input and extracts a hybrid system of the form of the tuple {M, X, W, E, Inv, flow}. The methodology has the following steps:

1—Input-output Segmentation: The input-output traces are first segmented considering times at which there is a potential discrete mode change. This is done by observing the set of controller outputs $\vec{o}$. Whenever there is a discrete transition due to a controller mode change, the controller output changes according to the decisions of the controller. There can be two types of controller outputs for a given mode:

a) a step output, where after a transition the controller output changes levels and stays at a given level unless there is another transition;

b) the output is a linear function of the continuous state variables of the physical system.

For both types of outputs, a sudden change in the slope of the controller output indicates a change in mode. The timestamps $\vec{T} = \{t_1, t_2, \ldots, t_k\}$ at which such jumps occur are considered to segment the controller inputs $\vec{x}$ and are marked to be potentially different controller modes. A controller mode where the controller output is constant is characterized by a sharp change in the differential of the output. The disclosed method employs a peak detection algorithm on the differential of the outputs and derives the modes that have a constant level as controller output. This gives the time stamps of some of the mode transitions. The time difference between two inflection points comprises an input-output segment which may be identified as a discrete controller mode.

2—Mode Classification: The total number of controller modes is determined and the segments are clustered into equivalence classes corresponding to each controller mode. The controller strategy or the jump condition for each mode can be computed:

For each segment where the output differential is zero, the controller strategy is to provide a constant level of actuation obtained from the output trace $\vec{o}$. For other segments, the disclosed method utilizes Fisher information theory to derive the linear equation connecting the controller output to the inputs.

For each output parameter, the disclosed method first derives controller inputs whose linear combination gives the considered output using Fisher information. Then, the estimator for the controller output is derived using the Cramer-Rao Lower Bound Theorem. Segments are then grouped into equivalence classes based on the derived jump conditions. Each equivalence class is a composite mode and represents a unique strategy of the controller.

3—Flow Extraction: For each mode, the disclosed method employs Fisher information and CRLB theorem to derive flow equations. The outputs of this re-classification are unique modes of the hybrid system, where two distinct modes may have different jump conditions or flow equations.

4—Guard Mining: The guard mining approach within the disclosed method takes as input the segmented input-output traces, wherein each segment is annotated with a controller mode. The disclosed method then considers every possible mode transition (m, m') and considers the values of the continuous state variables at the times of transitions, then develops the observation matrix $Go_{m \to m'}$. $Go_{m \to m'}$ is a n×d matrix, where each column corresponds to an observation of the continuous state variables at the time of transition from m to m', and there are d such instances when the same mode transition is observed. If $Go_{m \to m'}$ is full rank, the disclosed method obtains the rows that have constant values over all observation instances, and the guard condition is expressed as a conjunction of equality condition $G_{m,m'} = \cap \{x_i = q_i\}$ on all such continuous state variables which have constant values, where $q_i$ is the constant value in the guard observation matrix. For non-rectangular guards, the guard observation matrix will not be full rank. In such a case, the disclosed method considers each continuous variable $X_i$ and express it as a linear combination of the other variables and a constant value, i.e., $x_i = A\{x_1, x_2, \ldots x_n, 1\}$, where A is the coefficient matrix. Fisher information based analysis is then used to derive the coefficient matrix A. The output of this step expresses guards in the form of equalities. However, the half planes which belong to each mode are still needed at this step. This means for each transition (m, m') inequalities must be found. For this purpose, for each transition observed, the values of the differentials of the guard expressions are considered. If a guard expression is expressed as $G_j = \cap \{x_i = q_i\}$ and if $x_i > 0$, then the condition for $x_i$ is modified from $x_i = 0$ to $x_i \geq 0$. If the guard is expressed as $G_j = \cap \{x_i = \Sigma a_j x_{j \neq i} + c_i\}$, then the differential of the function $\dot{f} > x_i - \Sigma a_j x_{j \neq i}$ is considered. If from the observed input-output trace $\dot{f} > 0$, then the corresponding conjunction is modified to $x_i \geq \Sigma a_j x_{j \neq i} + c_i$.

5—Checking for Contradictions: In the final step, for different observations of the same mode transitions (m, m') if there is a contradiction in any of the guard conjunction, then such conjunctions are eliminated from all guard expressions. This means that for two (m, m') mode transition observations, consider that the corresponding mined guards are $G_1 = \cap x_i \approx_1 c_i^1$ and $\cap x_i \approx_2 c_i^2$, where $\approx_1 \approx_2 \in \{\geq, \leq\}$. Then, the following rules must be applied:

If $\approx_1 = \geq$ and $\approx_2 = \geq$, then the two terms can be replaced by the term $x_i \geq \min(c_i^1, c_i^2)$, If $\approx_1 = \leq$ and $\approx_2 = \leq$, then the two terms can be replaced by the term $x_i \geq \max(c_i^1, c_i^2)$, If $\approx_1 = \geq$ and $\approx_2 = \leq$, then the two terms can be eliminated from both the guard expressions if $c_i^2 \leq c_i^1$, If $\approx_1 = \leq$ and $\approx_2 = \geq$, then the two terms can be eliminated from both the guard expressions if $c_i^1 \leq c_i^2$.

Using the aforementioned rules, the present computer-implemented system mines consistent guards from the observations.

Once the HA is generated, its accuracy verification is crucial to the process. Collected input-output traces are compared to those generated using the inferred HA by calculating the root mean square error (RMSE) between the two sets of traces. The matching rate δ defines the accuracy of the inferred automaton that is evaluated according to some predefined rank α and used as a feedback to the present computer-implemented system. The accuracy of the inferred automaton depends on the number and length of traces. For example, if the length of the trace is too short, then some of the modes can be missed, since these modes are not visible in the trace. The present computer-implemented system uses the accuracy feedback to modify its inputs and refine the inferred automaton.

Figure 5:
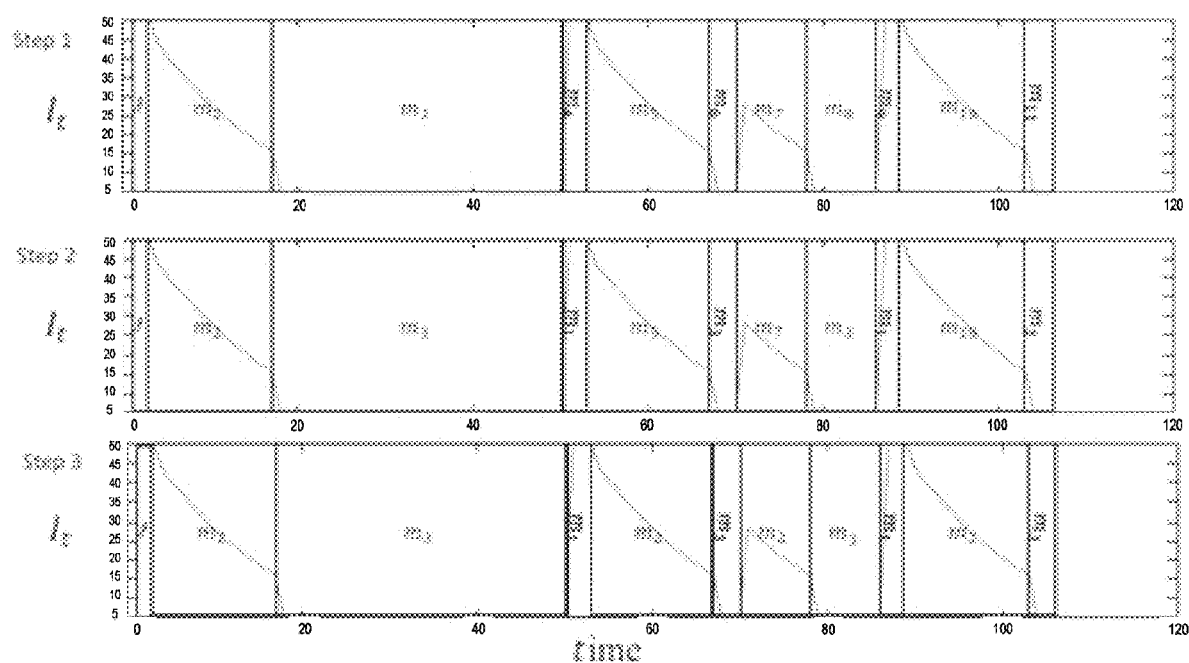
FIG. 5 is a graphical representation of mode classification using output traces.

Evaluation:

The accuracy of the present system in extracting a hybrid system is also important to consider. The hybrid system model of the AP is simulated for a given set of initial conditions to obtain input-output traces. The simulations were carried out in Simulink and a model-based Type-1 diabetes simulator. From input-output traces, the present system is applied to obtain the hybrid system model and the actual and inferred tuples are compared for accuracy. In addition, the operations of the two hybrid systems are evaluated in terms of the results of reachability analysis. The SpaceEx tool was used to derive the reach set for both the given and the inferred hybrid system and compare them to find differences. The AP example was used, showing the results of executing each step of the present system:

Artificial Pancreas (AP): The first step of the present system is to consider the differential of the controller output $I_t$ as shown in FIG. 5. Employing peak detection, the present system initially considers that there are as many modes as the number of peaks. From FIG. 5, the present system will consider the mode set $M = \{m_1, m_2 \ldots m_{11}\}$ as 11 distinct modes. The mode classification algorithm then considers the absolute value of $I_t$ to distinguish between modes where $I_t$ is constant or at $$\frac{dI_t}{dt} = 0.$$

As a result of this operation, the present system finds that $m_1 = m_4 = m_9$ and $m_3 = m_6 = m_8 = m_{11}$. The mode set is reduced to $M = \{m_1, m_2, m_3, m_5, m_7, m_{10}\}$. The present system then considers the segments where $I_t$ is not constant as shown in $I_m$ in FIG. 5 It employs the Fisher Information matrix and the MVUE to derive the linear relation of $I_t$ with $B_G$ and $B_i$. The analysis results in the same equation for modes $\{m_2, m_5, m_7, m_{10}\}$: $I_t = 0.5 B_g + 44.75$.

Figure 6:
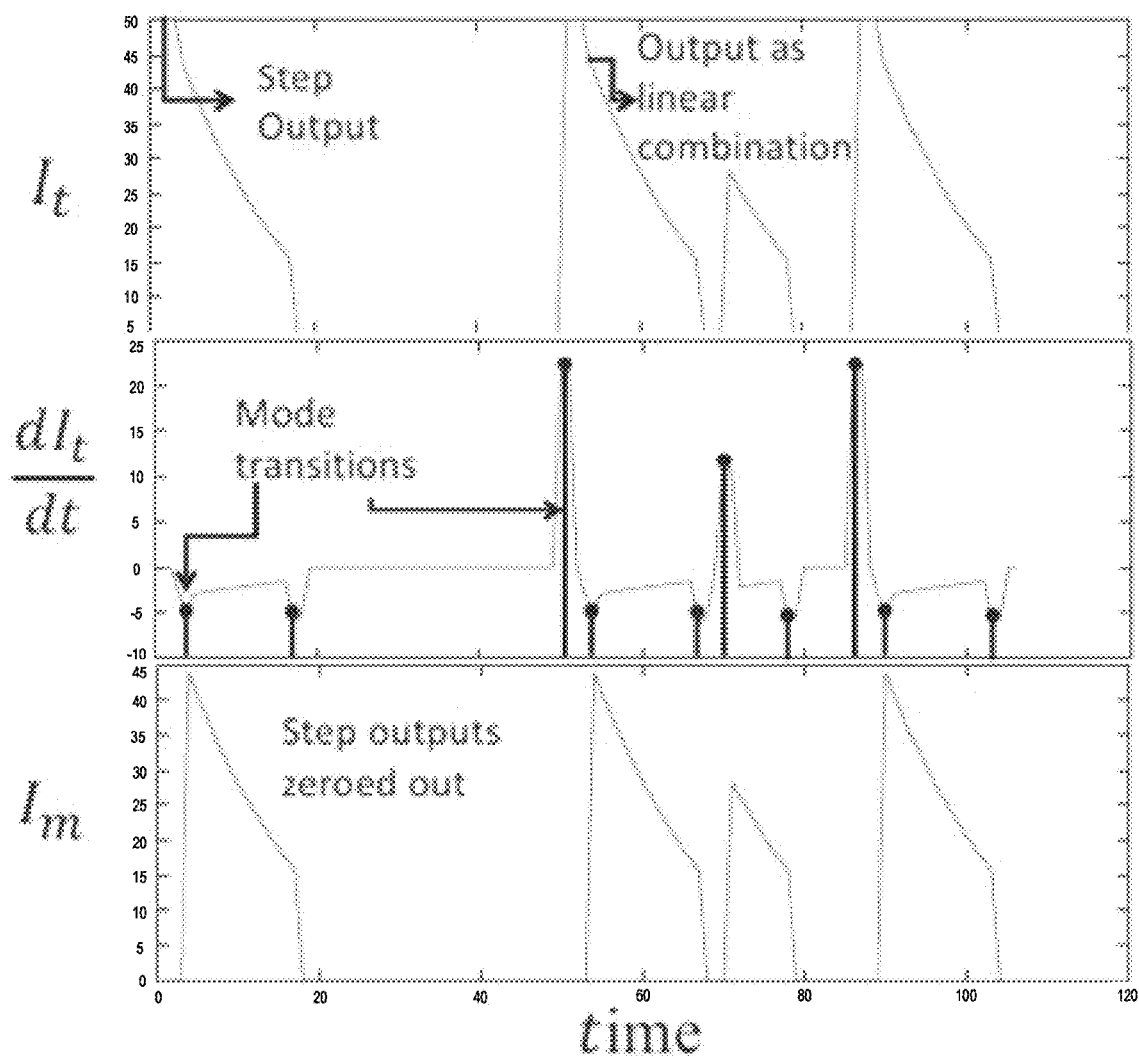
FIG. 6 is a graphical representation of input-output segmentation and jump condition retrieval.

Since the modes have the same linear equation relating the controller outputs to the inputs, the present system considers that $m_2 = m_5 = m_7 = m_{10}$. Hence, the total mode set is once more reduced to $M = \{m_1, m_2, m_3\}$. The present system then considers all the mode transition times and develops the jump conditions. This can be seen in FIG. 6, where input and output segmentation and jump retrieval can be seen. From the input output trace, it is observed that:

$$J_{m_1 \to m_2} = \{\{B_g; B_i; I_t\}, \{B_g; B_i; 0.5 B_g + 44.75\}\}$$

$$J_{m_2 \to m_3} = \{\{B_g; B_i; I_t\}, \{B_g; B_i; 50\}\}$$

$$J_{m_3 \to m_1} = \{\{B_g; B_i; I_t\}, \{B_g; B_i; 0.5 B_g + 44.75\}\}$$

$$J_{m_2 \to m_1} = \{\{B_g; B_i; I_t\}, \{B_g; B_i; 50\}\}$$

Figure 7:
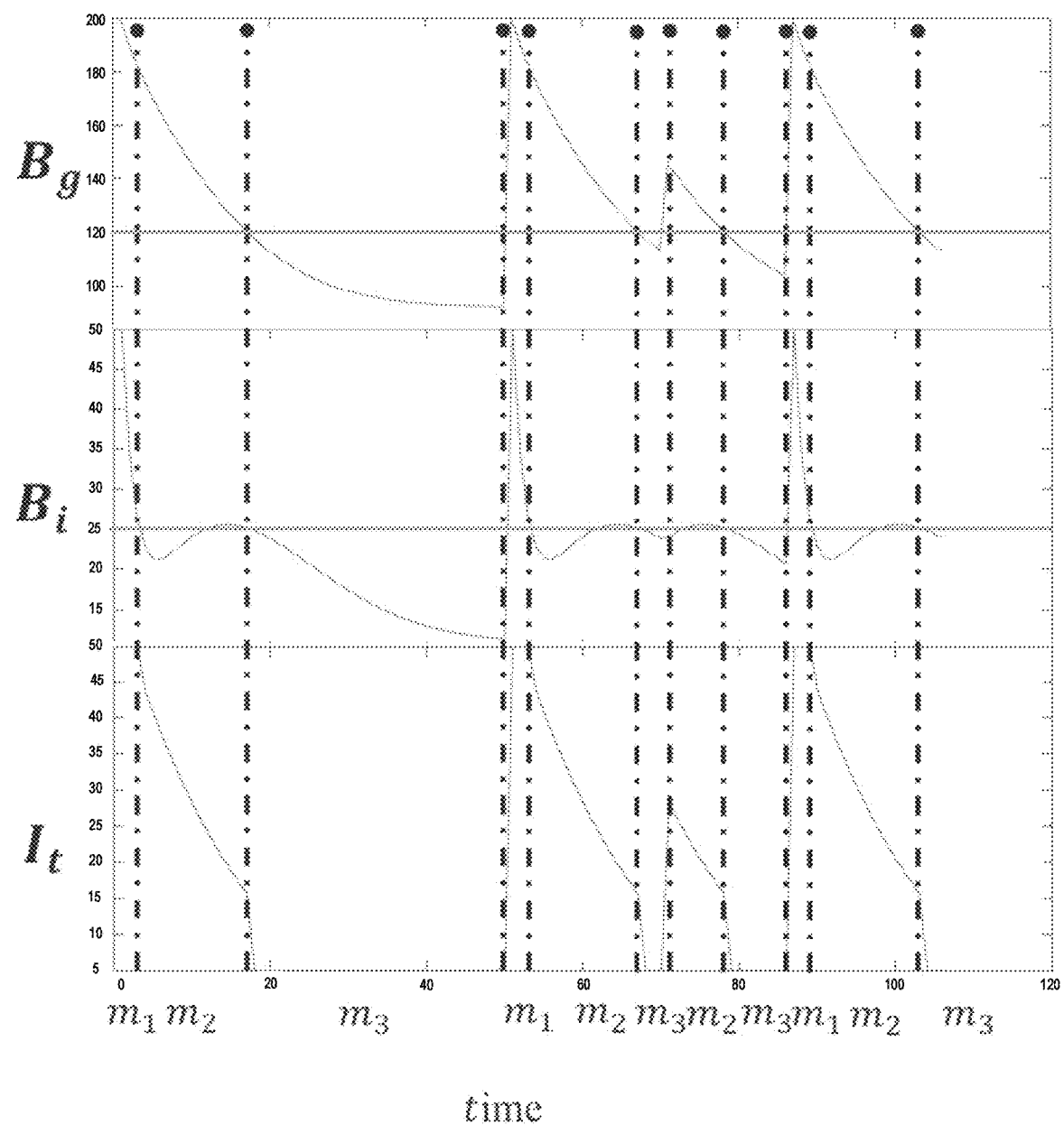
FIG. 7 is a graphical representation of a set of input traces $B_g$ and $B_i$, and output traces $I_t$ for the AP system obtained from the Type-1 diabetes simulator.

The next step is to find the flow equations in every segment using the traces of $I_t$, $B_g$, and $B_i$ (FIG. 7).

The linearization method described above results in a constant bias that depends on the sensed blood glucose, insulin concentration and interstitial concentration values. Hence the bias changes over time. However, the Cramer Rao based estimation only derives coefficients for the difference in the values of the continuous variables. Thus it could not accurately estimate the time varying bias. To circumvent the problem, the bias is added to the estimated constant obtained using the Cramer Rao bound at each time instant. Based on the Fisher Information matrix and the MVUE, the present computer-implemented derived the following set of equations:

$$\Delta \dot{X} = 45.84 \Delta X + 6.89^{-6} \Delta I + 2.47^{31\ 8} - 0.021 X(t) + 0.00001 (B_g - 10)$$

$$\Delta \dot{G} = 80.77 \Delta X + 45.49 \Delta G + 1.21^{-5} - X(t) \cdot B_g + 0.031 (G_b - B_g)$$

$$\Delta \dot{I} = 45.59 \Delta I + 3.95^{-8} - 0.3 B_i + 0.0033 h B_g - 0.0033 h G(0)$$

For every segment, the same equation was obtained, resulting in the conclusion that $m_1, m_2, m_3$ are unique modes and are not composite. The next step is to determine the guards. Considering the transition from $m_2$ to $m_3$, the guard observation matrix can be obtained from the traces shown in FIG. 7 as shown below:

$$Go_{m_2 \to m_3} = \begin{Bmatrix} 118.07 & 118.07 & 118.07 & 113.14 \\ 24.8 & 24.8 & 24.8 & 23.8 \end{Bmatrix}$$

$$Go_{m_1 \to m_2} = \begin{Bmatrix} 177.16 & 177.16 & 17.15.07 \\ 22.76 & 22.76 & 21.4 \end{Bmatrix}$$

The matrix $Go_{m_2 \to m_3}$ is a full rank matrix. Only the row that is constant is considered, however, there is no such row in this case. Hence, there are four different expressions for the guard corresponding to each observation in $Go_{m_2 \to m_3}$. The present computer-implemented system then considers the derivative of $B_g$ and $B_i$, at the transition point and uses the rules discussed in step 5. For all the transition points, from FIG. 7, we see that $\dot{B}_g<0$, indicating that the guard for transiting from $m_2$ to $m_3$ is $\dot{B}_g<118.07$. However, $\dot{B}_i$ had both positive and negative values resulting in a contradiction. Thus, the guard expression that uses $B_i$ is eliminated from the guard expression. The same operation results in the following guards:

$$G_{m_1 \to m_2}: B_g<177.1$$

$$G_{m_3 \to m_2}: B_g>118.07$$

$$G_{m_2 \to m_1}: B_g>177.1$$

The invariant set computation was trivial since it only required partitioning of $\mathcal{R}$ using the rectangular guards. The inferred AP hybrid system is almost similar to the given hybrid system discussed in the above section *CPS Hybrid System: the Artificial Pancreas*. The inferred and the given hybrid system are used in reachability analysis using the SpaceEx tool.

Figure 8:
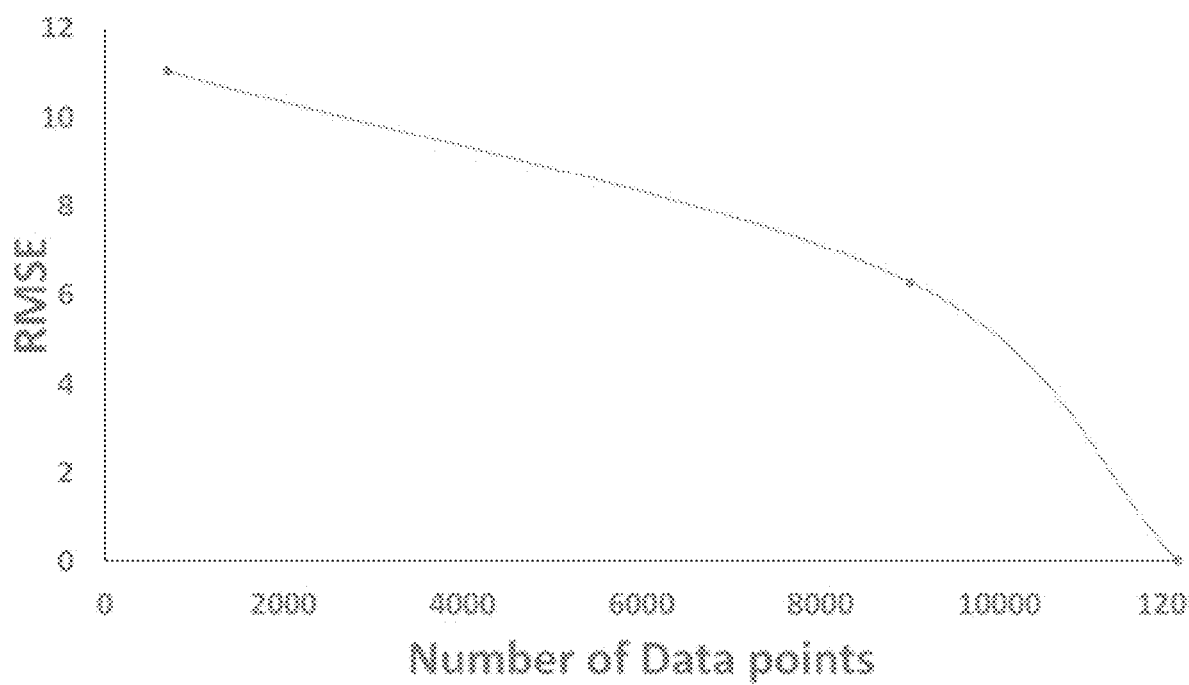
FIG. 8 is a graphical representation of the variation of root mean square error (RMSE) as the number of traces sampled is increased.

Verification and HA refinement: Initially, the present computer-implemented system takes as input a total of 9000 data points of traces of the AP system with a sampling period of 0.005. Input-output traces are generated by simulating the inferred HA and compared to the input-output traces collected for the verification and refinement step. The root mean square error between the two set of traces is approximately equal to 6.3, which is considerably high. Therefore, the number of collected traces is incremented by 1000 data points at each iteration and the present system is repeatedly run until an RMSE≈0 is achieved, as shown in FIG. 8. The present system successfully inferred the HA of the AP after 4 iterations (starting from 9000 data points as an initial input set) and a computation time of approximately 0.3 seconds.

Benefits of using inferred patient specific parameters: The AP system was executed with two parameter configurations:

a) taking statistical average parameters obtained from a large pool of Type-1 diabetic subjects;

b) obtaining the patient specific parameters for a given subject using the present computer-implemented system.

Figure 9:
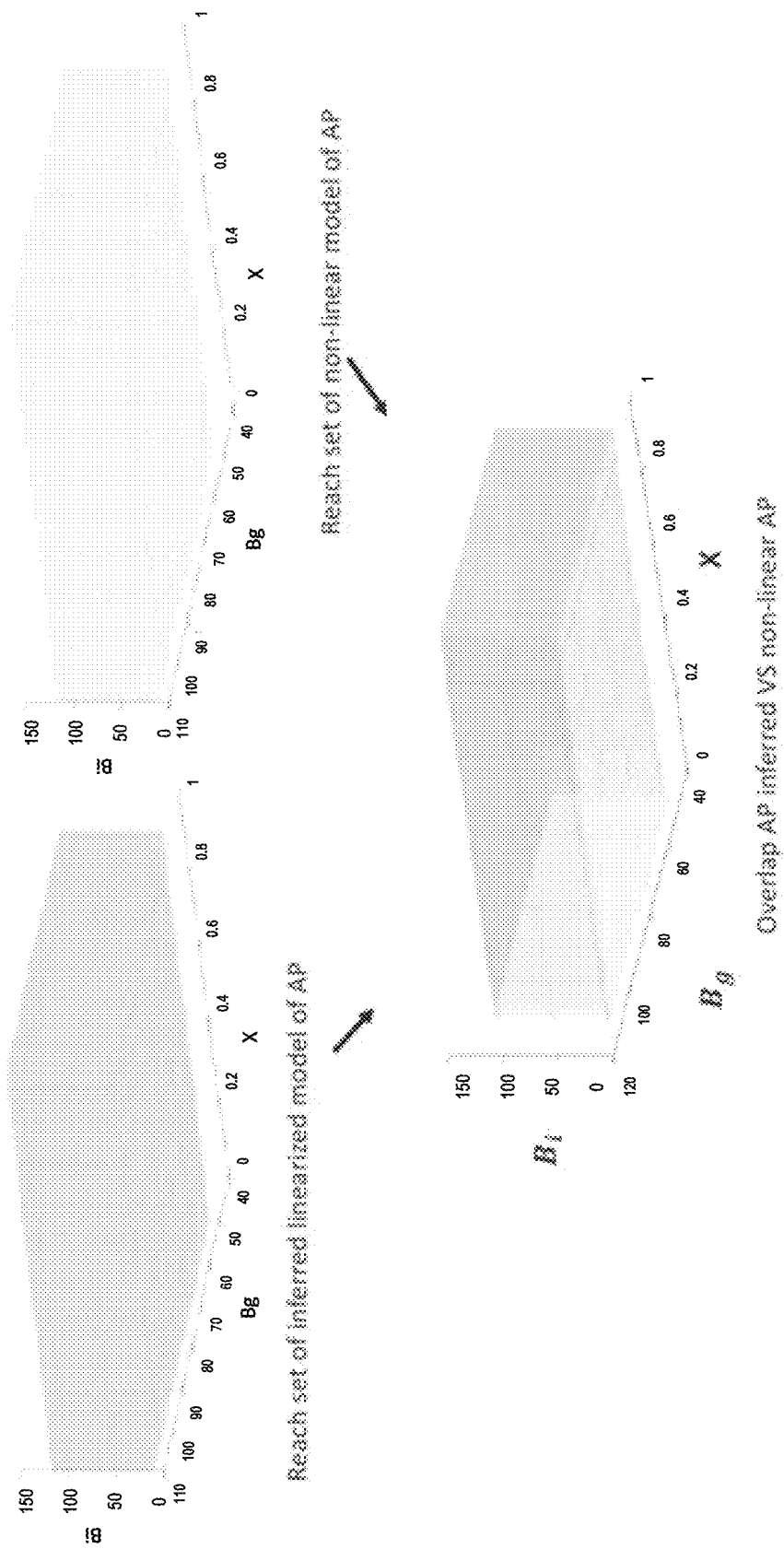
FIG. 9 is a graphical illustration of the comparison between the inferred hybrid system and a non-linear model.

FIG. 9 shows reach sets for both hybrid models starting from the same initial condition set.

Figure 10:
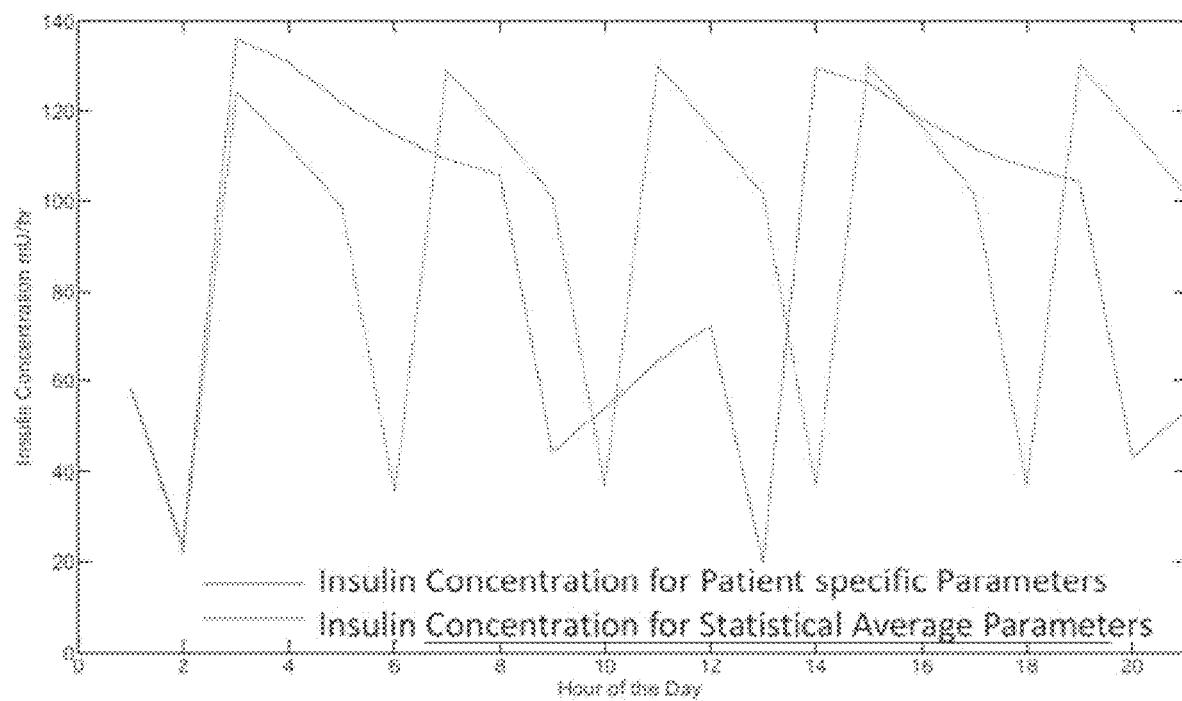
FIG. 10 is a graphical representation showing the comparison of inulin delivery using patient-inferred parameters and the use of statistical average parameters.

The blood glucose profile was kept the same for both the configurations. FIG. 10 shows the plot of the insulin concentration over time for both the configurations. The results show that using patient specific parameters in this scenario reduces total insulin delivery by 5.29%. This is a significant result as the aim of any controller is to achieve normal glucose levels with minimal insulin infusion.

The present computer-implemented system disclosed herein can extract linear hybrid systems from input-output traces of a CPS. The extracted hybrid system can have control modes where the controller output and non-rectangular guards are linear combination of the continuous state variables, and flow equations are not only able to be expressed as constant functions, but are also able to be expressed as a set of linear differential equations.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for inferring and fine tuning control parameters of a cyber-physical system, comprising:

a physical system including an actuator and one or more sensors that produces an input signal and an output signal, a relationship between the input signal and the output signal being representative of physical dynamics of the physical system; and a controller that generates a hybrid automaton based on continuous variables measured from the one or more sensors of the physical system and computes a next controller output for the actuator of the physical system based on the hybrid automaton, wherein to generate the hybrid automaton, the controller accesses as inputs the continuous variables including time series input and output traces of the physical system, segments the time series input and output traces into a plurality of segments according to a sudden change in a slope of the continuous variables, infers a controller strategy for each segment of the plurality of segments such that the controller clusters each segment into one of a plurality of equivalence classes based on their respective controller strategies, each equivalence class corresponding to a controller mode of a plurality of controller modes, derives one or more polynomial flow equations representative of physical dynamics of the physical system for each mode, and derives one or more guard conditions representative of a boundary that causes a controller mode change for each mode.

2. The system of claim 1, wherein the hybrid automaton defines an output of the controller and includes the plurality of control modes, the one or more polynomial flow equations, and the one or more guard conditions the cyber-physical system.

3. The system of claim 2, wherein the controller strategy includes a reset condition and one or more jump conditions.

4. The system of claim 1, wherein the controller is adapted to:

compare a set of collected controller input-output traces associated with the physical system with a set of inferred controller input-output traces to validate safety and optimal performance of the physical system and the hybrid automaton, wherein the set of inferred controller input-output traces are generated by the hybrid automaton.

5. The system of claim 4, wherein the root mean square error is taken between the set of collected controller input-output traces and a set of inferred controller input-output traces, wherein an amount of input-output traces taken as input by the system within a predetermined period of time is iteratively increased until the root mean square error is close to zero.

6. The system of claim 1, wherein each of a set of timestamps associated with the plurality of segments is representative of a potential controller mode change, wherein each one of the set of timestamps corresponds with a peak in the rate of change of observed controller inputs or observed controller outputs defined by the continuous variables.

7. The system of claim 6, wherein the controller is further adapted to:
associate a linear equation with each one of the plurality of segments, wherein the linear equation maps the set of observed controller outputs to the set of observed controller inputs.

8. The system of claim 1, wherein the physical system is an artificial pancreas such that the actuator is an infusion pump and the continuous variables include one or more glucose-meter values, the hybrid automaton generated by the controller being implemented by the controller to access the one or more glucose-meter values and to output by the controller an amount of insulin infusion rate for the infusion pump.

9. The system of claim 8, wherein hybrid automaton implemented by the controller linearizes a plurality of non-linear differential equations associated with blood glucose levels and insulin levels of a specific patient such that the amount of insulin infusion rate for the infusion pump is computed for the specific patient.

10. A system for optimizing control parameters of a cyber-physical system, comprising:
a physical system including an actuator and one or more sensors that produces one or more input signals and one or more output signals, a relationship between the one or more input signals and the one or more output signals being representative of physical dynamics of the physical system; and
a controller that generates a hybrid automaton based on continuous variables measured from the one or more sensors of the physical system and computes a next controller output for the actuator of the physical system based on the hybrid automaton,
wherein to generate the hybrid automaton, the controller:
identifies a mode transition of the physical system by identifying a sudden change in a derivative of the one or more output signals, wherein a time interval between a mode transition is a segment of a plurality of segments,
identifies jump conditions and reset conditions relating the one or more output signals to the one or more input signals for each segment of the plurality of segments,
clusters the plurality of segments into one or more discrete modes according to their respective jump conditions and reset conditions,
determines one or more polynomial flow equations for each discrete mode, each polynomial flow equation relating the one or more input signals and the one or more output signals and being indicative of dynamics of the physical system, and
derives one or more guard conditions representative of a boundary that causes a controller mode change for each discrete mode based on the one or more input signals and the one or more output signals,
wherein the hybrid automaton includes the one or more discrete modes, the one or more polynomial flow equations and the one or more guard conditions.

11. The system of claim 10, wherein reset conditions are representative of an initialization of each new segment and wherein reset conditions include a linear relationship between the input signal and the output signal for each segment.

12. The system of claim 10, wherein jump conditions include values for one or more input signals and the one or more output signals associated with two neighboring segments, wherein jump conditions compare a mode transition between the two neighboring segments.

13. The system of claim 10, wherein polynomial flow equations are determined for each mode by determining relationships between the one or more input signals and the one or more output signals associated with each mode based on an unbiased estimator.

14. The system of claim 10, wherein guard expressions are determined for each mode transition by determining relationships between controller output values at each mode transition.

15. The system of claim 14, wherein to determine the guard expressions for a mode transition, the controller:
expresses each of a plurality of continuous variables associated with the one or more input signals or the one or more output signals as a linear combination of each other continuous variable of a plurality of continuous variables associated with the one or more input signals or the one or more output signals; and
determines a coefficient matrix for the linear combination using Fisher Information,
wherein the linear combination expression is expressed as a conditional inequality.

16. A method for inferring and fine tuning control parameters of a cyber-physical system, comprising:
accessing, by a controller, continuous variables defining input and output traces from a cyber-physical control system, the cyber-physical system including a physical system and a control system for controlling the physical system, the physical system including an actuator and one or more sensors; and
learning, by the controller, a hybrid automaton to compute a set of parameters for enhancing control of the physical system, by:
identifying a set of control modes of the hybrid automaton, by:
segmenting the input and output traces according to observed sudden changes in differential of controller output, and
classifying the set of control modes by determining a total number of the set of control modes and clustering the input and output traces as segmented into equivalence classes corresponding to each of the set of control modes,
deriving, for each of the set of control modes, a flow function that assigns a set of differential equations that relates the continuous variables to its derivatives and the controller outputs, and
computing guard conditions defining transitions between the set of control modes.

17. The method of claim 16, wherein the observed sudden changes in controller output include (a) a step output where after a transition in controller mode change the controller output stays level unless another transition occurs, or (b) an output defining a linear function of the continuous variables of the physical system.

18. The method of claim 16, further comprising:
transmitting to the actuator, by the controller, a decision to perform a change in mode; and
effectuating the change in mode by the actuator of the physical system.

19. The method of claim 16, further comprising:
verifying accuracy of the hybrid automaton, by:
  comparing a portion of the input and output traces from the cyber-physical system to inferred input output traces as inferred from the hybrid automaton; and
calculating, by the controller, a root mean square error between the input and output traces and the inferred input and output traces to output a matching rate, the matching rate evaluated in view of a predefined rank value to access the accuracy of the hybrid automaton.

* * * * *

UNITED STATES PATENT AND TRADEMARK OFFICE
CERTIFICATE OF CORRECTION

| | |
|---|---|
| PATENT NO. | : 11,054,807 B2 |
| APPLICATION NO. | : 16/413018 |
| DATED | : July 6, 2021 |
| INVENTOR(S) | : Sandeep K. S. Gupta, Ayan Banerjee and Imane Lamrani |

It is certified that error appears in the above-identified patent and that said Letters Patent is hereby corrected as shown below:

In the Claims (Claim 2) Column 10, Line 45, after "one or more guard conditions" and before "the cyber-physical system", insert --specific to--.

Signed and Sealed this
Fifteenth Day of November, 2022

Katherine Kelly Vidal
*Director of the United States Patent and Trademark Office*